(12) United States Patent
Schoen et al.

(10) Patent No.: US 8,710,686 B2
(45) Date of Patent: Apr. 29, 2014

(54) MACHINE TOOL WITH AN ELECTRICAL GENERATOR FOR PASSIVE POWER GENERATION

(75) Inventors: Ludwig Schoen, Ludwigsburg (DE); Florian Esenwein, Uhingen-Holzhausen (DE)

(73) Assignee: Robert Bosch GmbH, Stuttgart (DE)

( * ) Notice: Subject to any disclaimer, the term of this patent is extended or adjusted under 35 U.S.C. 154(b) by 534 days.

(21) Appl. No.: 13/031,315

(22) Filed: Feb. 21, 2011

(65) Prior Publication Data
US 2011/0204786 A1 Aug. 25, 2011

(30) Foreign Application Priority Data

Feb. 22, 2010 (DE) .......................... 10 2010 002 182

(51) Int. Cl.
*F02N 11/00* (2006.01)
(52) U.S. Cl.
USPC ...................................................... 290/38 R
(58) Field of Classification Search
USPC ................................. 290/38 R; 310/168–170
See application file for complete search history.

(56) References Cited

U.S. PATENT DOCUMENTS

| 3,825,782 | A | * | 7/1974 | Dassler | 310/168 |
| 3,894,257 | A | * | 7/1975 | Reed | 310/105 |
| 4,127,799 | A | * | 11/1978 | Nakamura et al. | 318/373 |
| 5,177,393 | A | * | 1/1993 | Webber | 310/68 B |
| 5,734,217 | A | * | 3/1998 | Morinigo | 310/166 |
| 6,356,046 | B1 | * | 3/2002 | Koumura et al. | 318/696 |
| 6,777,846 | B2 | * | 8/2004 | Feldner et al. | 310/200 |
| 6,864,606 | B2 | * | 3/2005 | Rose, Sr. | 310/74 |
| 7,312,549 | B2 | * | 12/2007 | Rasmussen | 310/168 |
| 7,999,427 | B2 | * | 8/2011 | Wilson et al. | 310/83 |
| 8,014,096 | B2 | * | 9/2011 | Huang et al. | 360/59 |

FOREIGN PATENT DOCUMENTS

DE 10 2006 045 157 4/2008

* cited by examiner

*Primary Examiner* — Jean F Duverne
(74) *Attorney, Agent, or Firm* — Maginot, Moore & Beck

(57) ABSTRACT

A machine tool with a generator for generating electrical power is disclosed. The generator has a rotor and a stator. A coil and a magnet are arranged on the stator. The rotor is capable of moving relative to the stator and has a first region and a second region. The rotor is configured in such a way that, during a movement of the rotor relative to the stator, a magnetic flux in the coil is changed due to differences between the first and second regions in terms of their magnetic permeability and/or in terms of their geometric configuration, and an electrical voltage is induced.

21 Claims, 15 Drawing Sheets

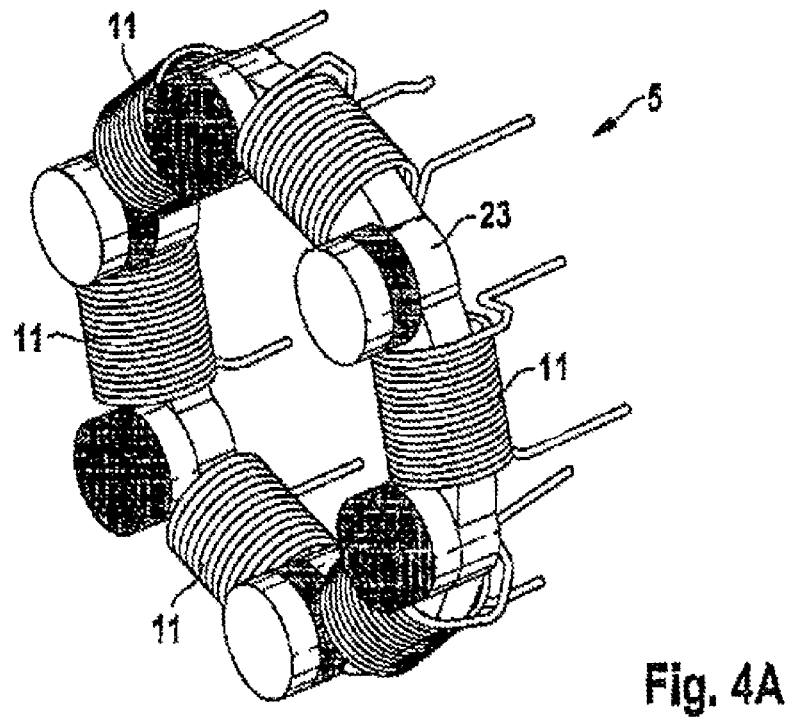
Fig. 4A
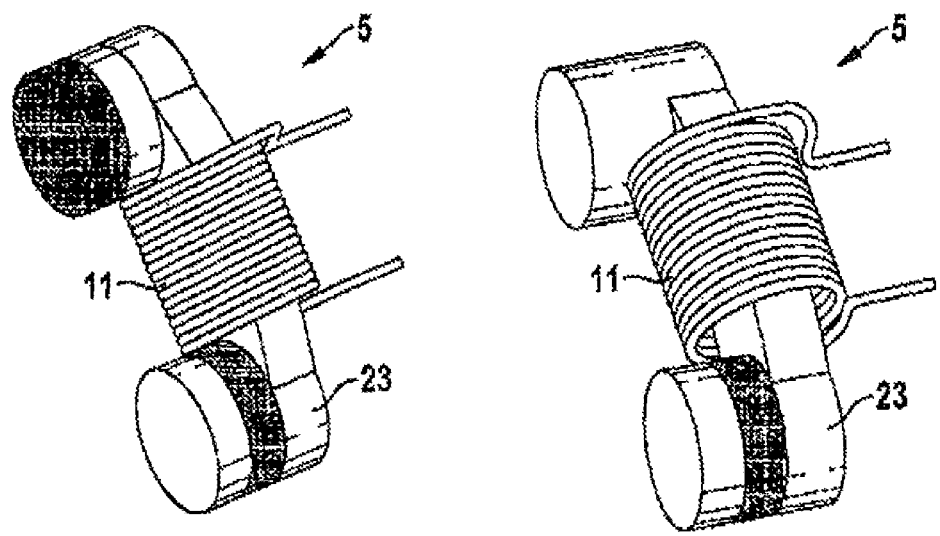
Fig. 4B
Fig. 4C

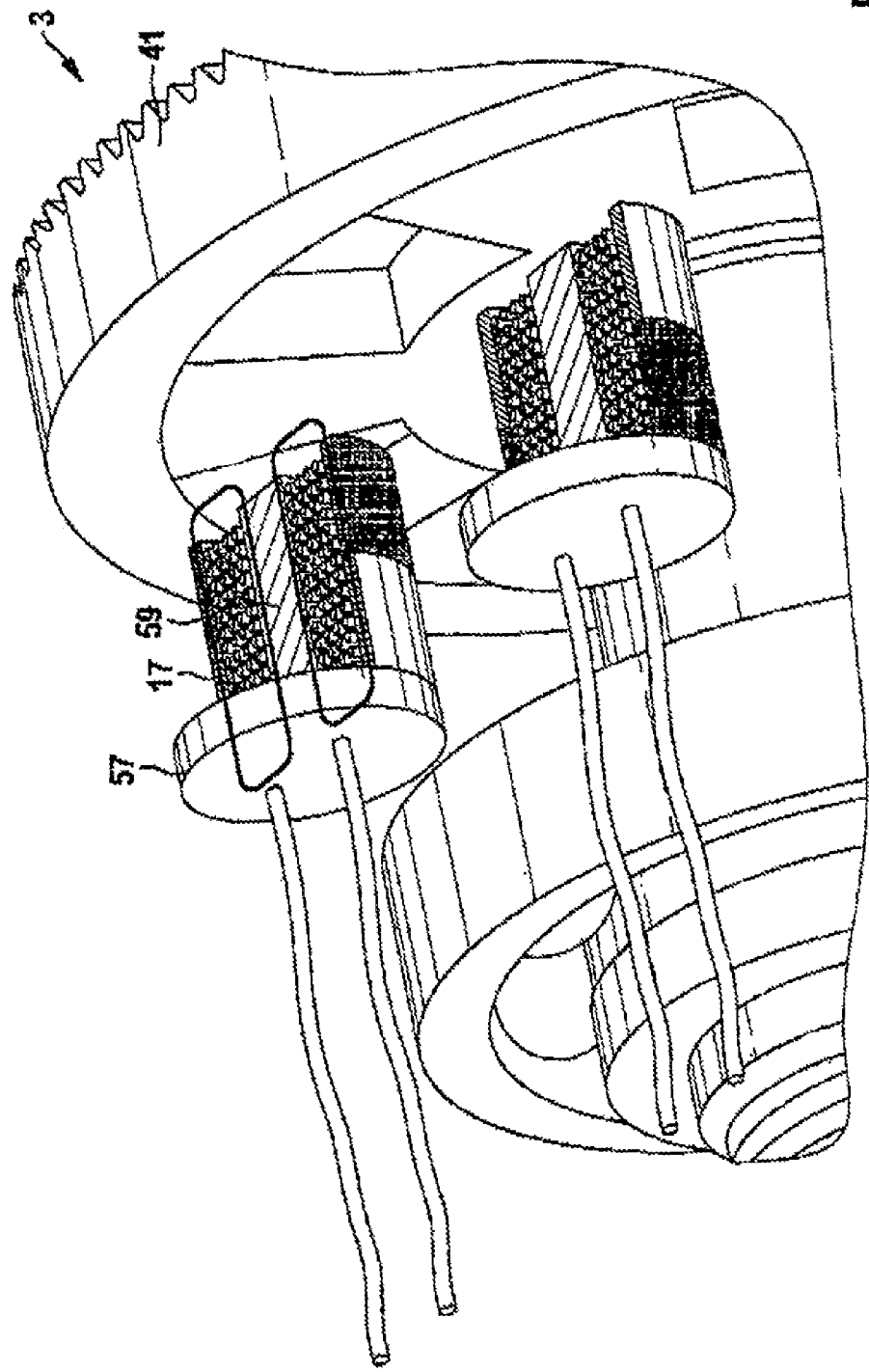

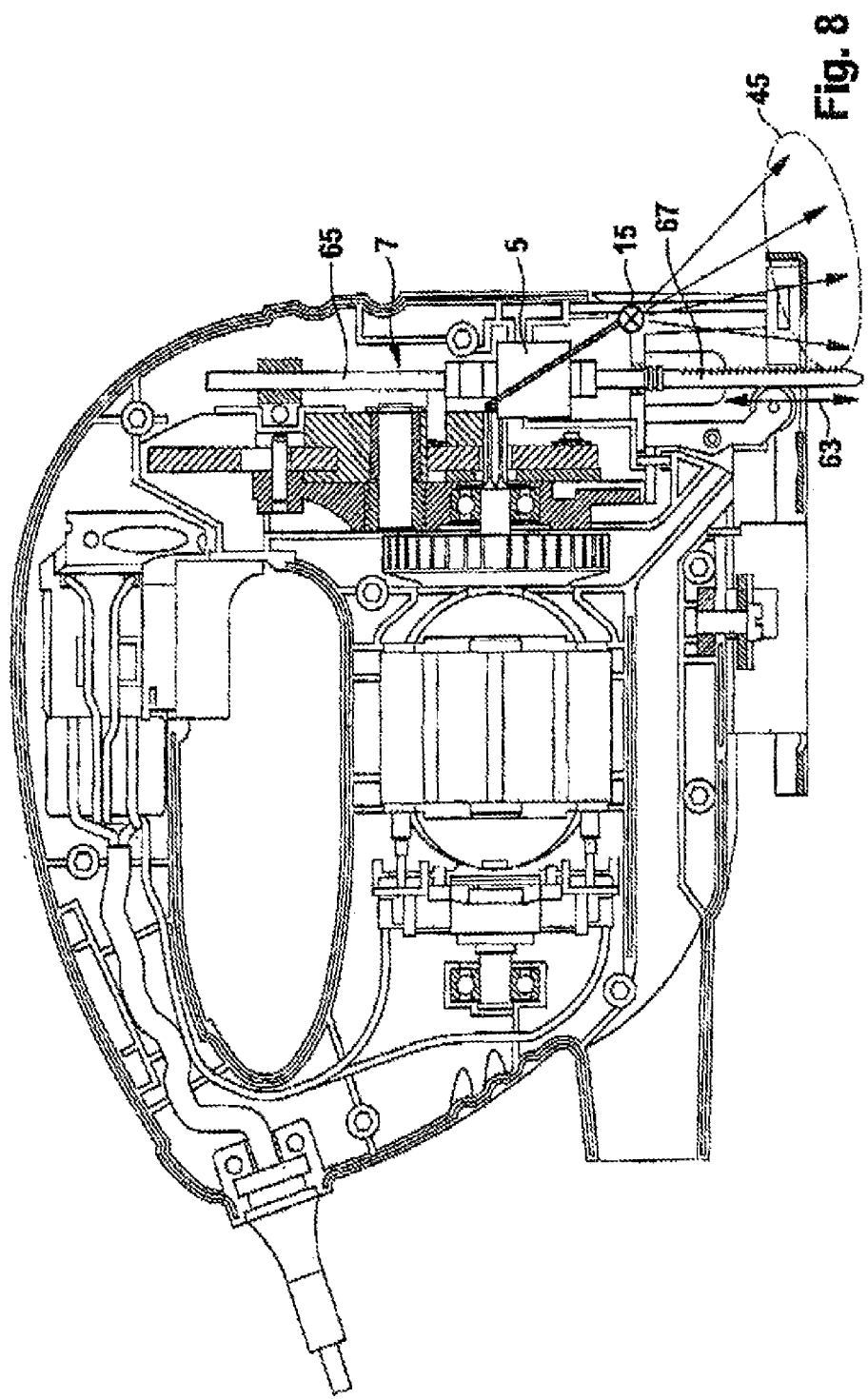

MACHINE TOOL WITH AN ELECTRICAL GENERATOR FOR PASSIVE POWER GENERATION

This application claims priority under 35 U.S.C. §119 to German patent application no. 10 2010 002 182.2, filed Feb. 22, 2010, the disclosure of which is incorporated herein by reference in its entirety.

Cross Reference is made to copending U.S. patent application Ser. No. 13/031,483, entitled "Machine Tool with an Active Electrical Generator for Power Generation," filed on Feb. 21, 2011.

The present disclosure relates to a machine tool with an electrical generator for passive power generation.

BACKGROUND

When working with electric tools, auxiliary means are often required for optimizing the performance of work. For example, illumination of the working area by means of light-emitting means may be useful.

DE 10 2006 045 157 A1, for example, has disclosed tools in which the light-emitting means are integrated in the tool. However, the supply of energy to the light-emitting means can pose a problem.

SUMMARY

An object of the present disclosure can therefore be considered that of providing an improved machine tool which enables a supply of energy to additional elements.

This object can be achieved by the subject matter of the present disclosure. Advantageous embodiments of the present disclosure are described herein.

Features, details and possible advantages of an apparatus in accordance with the embodiments of the disclosure will be discussed in detail below.

In accordance with a first aspect of the present disclosure, a machine tool, such as a handheld machine tool, for example, with a generator which generates electrical energy or power is described. The generator has a stator and a rotor which is capable of moving in relation thereto. At least one coil, for example an induction coil, and at least one magnet, for example a permanent magnet or an electromagnet, are arranged on the stator. The rotor has at least one first and at least one second region. The first region has a first magnetic permeability and a first geometric configuration. The second region has a second magnetic permeability and a second geometric configuration. The first permeability and the second permeability are in this case different and/or the first geometric configuration and the second geometric configuration are different. Depending on whether the first or second region of the rotor is located closer to the stator, the magnetic lines of force emanating from the magnet can propagate differently. During a movement of the rotor relative to the stator, the position of the first and second regions of the rotor with respect to the stator changes continuously. As a result, the magnetic flux changes and a voltage in the coil of the stator is induced.

The first and second regions of the rotor can be configured, for example, as a profile in the rotor. That is to say that the first region can correspond to elevations and the second region can correspond to cutouts in the rotor. Optionally, different materials, in particular with different magnetic permeability, can be used for the different regions.

With the aid of the generator according to the disclosure, it is possible to provide voltage or electrical energy for machine tool-internal components, such as light sources for illuminating the working area, for example. This electrical energy is advantageously independent of a mains or battery voltage of the machine tool. Therefore, no additional elements for rectification and transformation of the mains current need to be installed in the machine tool. This may be advantageous in particular in the case of handheld machine tools since a weight saving can also be made. In addition, the electrical circuit of the generator according to the disclosure can be designed for operation on a low voltage (for example less than 50 V) and is therefore not subject to the requirements for mains-operated machines, such as the maintenance of insulation gaps, for example. This provides greater freedom in terms of the structural design of the machine tool.

In addition, the generator according to the disclosure is preferably designed without any movable magnets. During operation of the machine tool, only the rotor moves, while both the coil and the magnet are arranged immovably on the stator. This makes it possible for already existing machine tools to be subsequently modified in a simple manner. In addition, this enables simple, space-saving and inexpensive implementation of an energy source for machine-internal components of newly produced machine tools, such as light sources, for example.

In accordance with one exemplary embodiment of the disclosure, the stator and the rotor comprise ferromagnetic materials. That is to say the relative permeability $\mu$ of the materials is equal to, greater than or preferably substantially greater than 1 ($\mu \gg 1$). Such materials can be, for example, steel, iron, cobalt, nickel and combinations thereof. The stator and the rotor can for the most part or completely consist of these materials.

In accordance with one exemplary embodiment, the rotor can be coupled to the output drive, for example to an output shaft, of the machine tool mechanically in a force-fitting, form-fitting and/or frictionally engaged manner or can be formed as part of the output drive or integrated therein. This can take place, for example, by the change of existing parts of the output drive and can thus be implemented in a cost-saving manner. The rotor can also be connected to the output drive cohesively, such as by means of an adhesive, for example. The output drive can be part of the machine which outputs power and can be, for example, a spindle, a ring gear, an accommodating flange or a tool receptacle, a motor shaft or the protrusion thereof.

In accordance with a further exemplary embodiment, the generator can have a second circuit which is electrically isolated from or independent of the first circuit of the machine. The first circuit is connected, for example, to a mains supply or a rechargeable battery supply. The second circuit can generate a voltage which is different from the first circuit by the operation of the generator. As a result, for example, a machine-internal light source, for example, can be supplied with energy without a mains voltage needing to be transformed and rectified. It is thus possible to dispense with additional components and therefore to save installation space and considerable additional costs.

In accordance with further exemplary embodiments, the machine tool can have one or more light sources. The light source is supplied with energy by the generator according to the disclosure and is connected thereto, for example directly or via an electrical transducer. In addition, the light source can be integrated directly into the machine or arranged thereon and can be a light source which enables possibly continuous illumination of a working area during operation of the machine. An additional light source can output a light signal, for example by means of changing color or by means of a change in intensity and therefore indicate a present rotation speed of the rotor. For example, the signal can be a blinking signal. It is thus possible to signal that specific rotation speeds are being passed through, exceeded and/or undershot, for example in the event of an overload, and an overtravel of the rotor or the motor even once the machine has been disconnected. In addition, for example, an additional light source can be configured as a laser light source for labeling the working area and guiding the machine.

In accordance with a further exemplary embodiment, the machine tool has an electrical energy store, such as a capacitor and/or a rechargeable battery, for example. By virtue of the electrical energy store, it is possible, for example, for the persistence time and intensity of the light source to be improved. The electrical energy store can be integrated, for example, in electronics of the machine. In the electronics, the electrical voltage generated can be matched to the requirements of the light source.

In accordance with a further exemplary embodiment, the coil or a plurality of coils of the stator is or are arranged at or on a yoke which intensifies the magnetic flux. The yoke can connect the magnet(s) to one another and/or to the coil(s). The yoke can have a higher magnetic permeability than the material of the stator housing, for example, and can contribute to targeted guidance of the magnetic lines of force and intensify the magnetic flux. Owing to this intensification of the flux, a sufficient voltage, for example for operation of light sources, can also be generated at low operating speeds.

In accordance with a further exemplary embodiment, the rotor can perform a rotary or linearly oscillating movement. The machine tool can therefore be configured as, for example, an angle grinder or straight grinder, screwdriver, drill, circular saw or in the form of a saw, for example a jigsaw, a saber saw, a crosscut saw or precision saw.

BRIEF DESCRIPTION OF THE DRAWINGS

Further features and advantages of the present disclosure will become apparent to a person skilled in the art from the description below relating to exemplary embodiments, which should not, however, be interpreted as being restrictive to the disclosure, with reference to the attached drawings.

FIGS. 4A, 4B, 4C show possible embodiments of the stator from FIGS. 3A-3D;

FIGS. 7A, 7B, 7C show a configuration of the stator with magnet coils;

FIG. 8 shows a cross section through a jigsaw;

Figure 1:
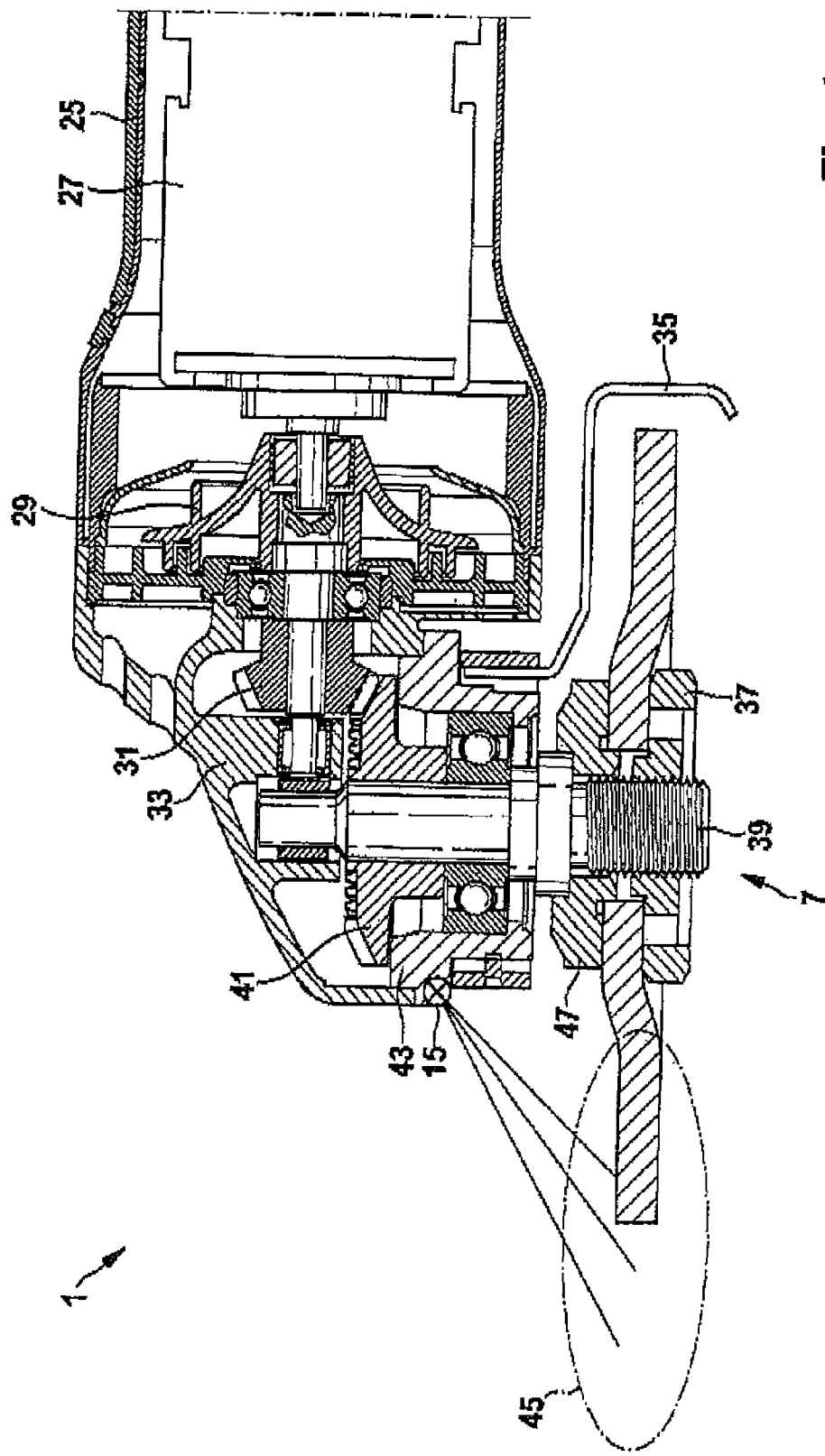
FIG. 1 shows a cross section through an angle grinder.

All of the figures are merely schematic illustrations of devices according to the disclosure or parts thereof. In particular, distances and size relationships have not been reproduced true to scale in the figures. Corresponding elements have been provided with the same reference numerals in the various figures.

DETAILED DESCRIPTION

FIGS. 1 to 7 illustrate the machine tool with a rotating rotor using the exemplary embodiment of an angle grinder, and FIGS. 8 to 10 illustrate the machine tool with a linearly oscillating rotor using the example of a jigsaw.

FIG. 1 shows a schematic illustration of a cross section through an angle grinder 1. The angle grinder 1 has the conventional components such as motor housing 25, motor 27, fan 29, pinion 31, gear housing 33, protective cover 35, two-hole nut 37, spindle 39, ring gear 41, bearing flange 43 and accommodating flange 47. A light source 15 can illuminate a working region 45 or the working area 45. The light source 15 can be integrated, for example, in the bearing flange 43. In the case of the angle grinder 1, the ring gear 41, the accommodating flange 47 or the spindle 39 can be used as the rotor 7.

Figure 2A:
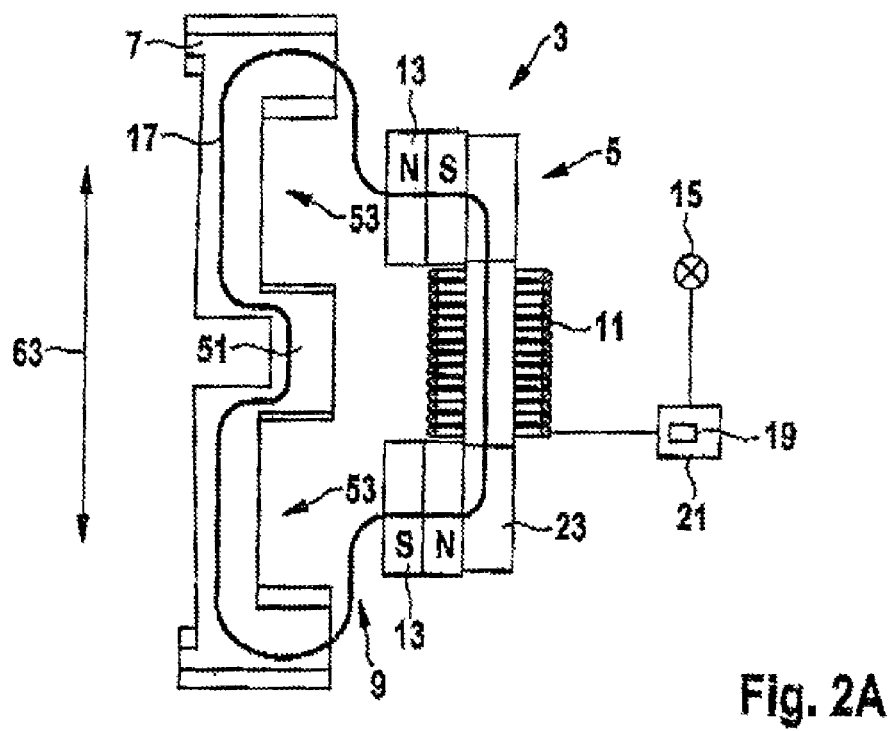
FIGS. 2A, 2B show, schematically, the mode of operation of the generator of the machine tool.
Figure 2B:
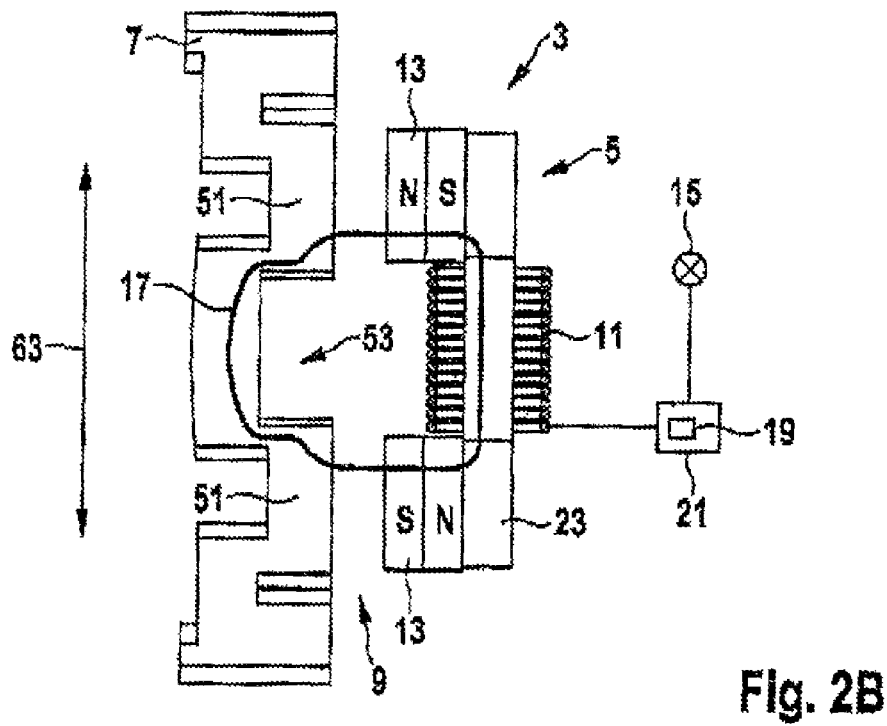

FIGS. 2A and 2B represent the mode of operation of the generator 3 of the machine tool 1. In this case, FIGS. 2A and 2B show cross sections through the generator 3 in different movement phases of the rotor 7. A coil 11 and two magnets 13 with different polarity are arranged on the stator 5. The magnets 13 and the coil 11 are arranged on a yoke 23 for intensifying the magnetic flux.

Owing to the movement 63 (indicated by the arrow) of the rotor 7 with respect to the stator 5, the magnetic field in which the coil 11 is located changes. As a result, a voltage is induced in the coil 11, it being possible for the voltage to be passed on to a light source 15, for example via the electronics 21, which can comprise an electrical energy store 19. A change in the magnetic field can be achieved, for example, by the change in the resistance (also referred to as reluctance) of the magnetic circuit.

In FIG. 2A, a first region 51 of the rotor 7 is located opposite the coil 11 of the stator 5. Second regions 53 of the rotor 7 are located opposite the magnets 13 of the stator 5. In the exemplary embodiment, the first region 51 and the second region 53 have different geometric configurations. The first region 51 has an elevation in the direction of the stator 5. The second region 53, on the other hand, is set back with respect to the stator 5 in comparison with the first region 51, with the result that the air gap 9 between the stator 5 and the rotor 7 in the second region 53 is greater than in the first region 51.

During a movement 63 of the rotor 7, the magnetic flux emanating from the permanent magnet 13 changes. The magnetic lines of force 17 therefore change as illustrated in FIG. 2 and a voltage 11 is induced in the coil.

The regions 51, 53 of the rotor 7 can comprise different materials with different magnetic permeability given the same or different geometric configuration. In this case, the rotor 7 can be realized by virtue of changes to existing parts of the output drive 49 of the machine tool 1. For example, the rotor 7 can be provided with grooves. During a movement of the rotor 7, the reluctance changes as follows: in a position of the grooves 51 with respect to the magnets 13, a high reluctance is brought about by the large air gap 9; in a position of webs 51 with respect to the magnets, a low reluctance is brought about.

Figure 3A:
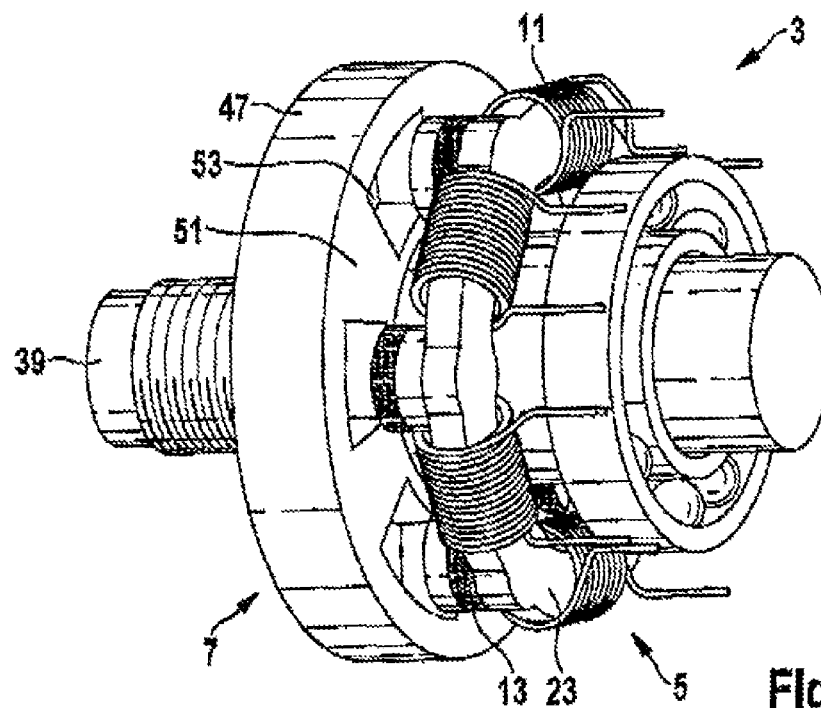
FIGS. 3A, 3B, 3C, 3D show a generator with an accommodating flange as rotor.
Figure 3B:
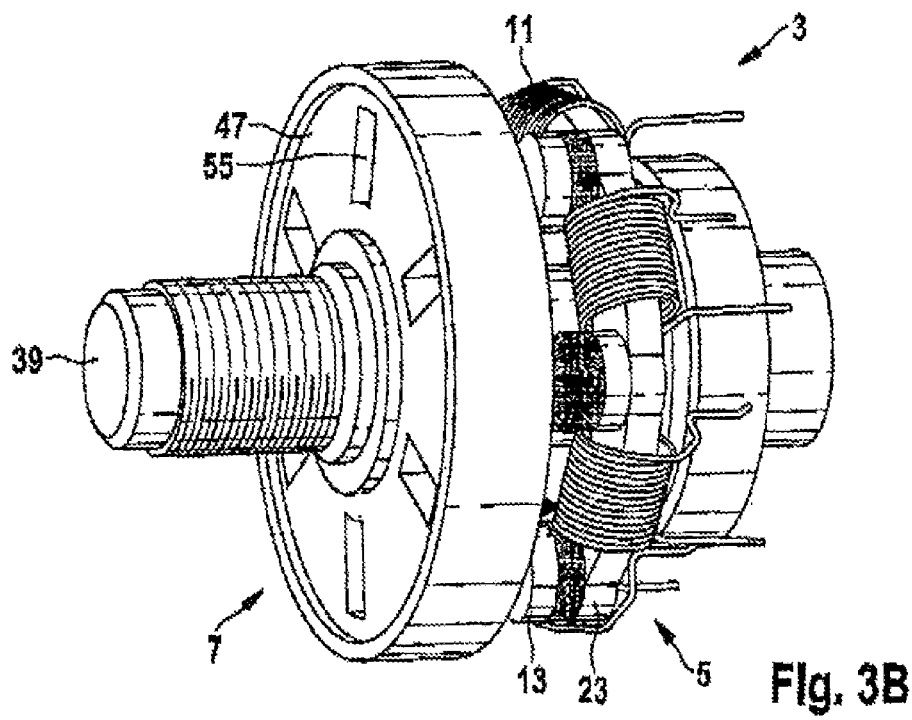
Figure 3C:
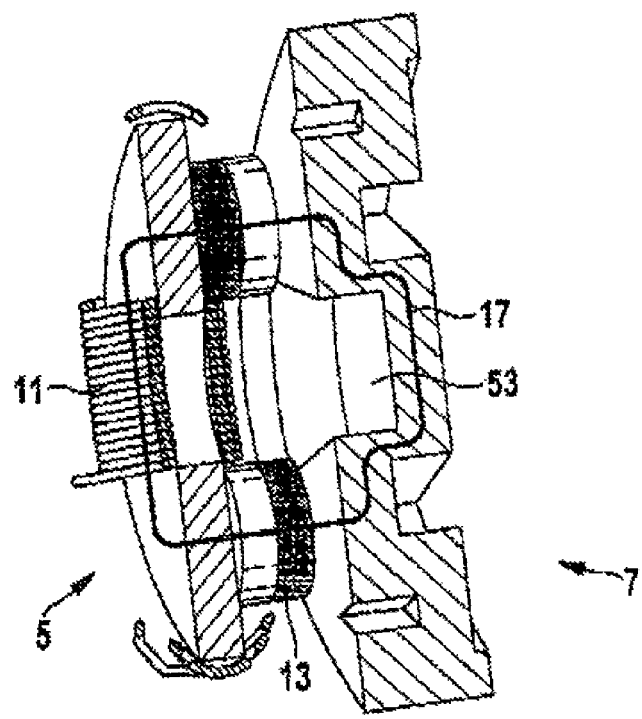
Figure 3D:
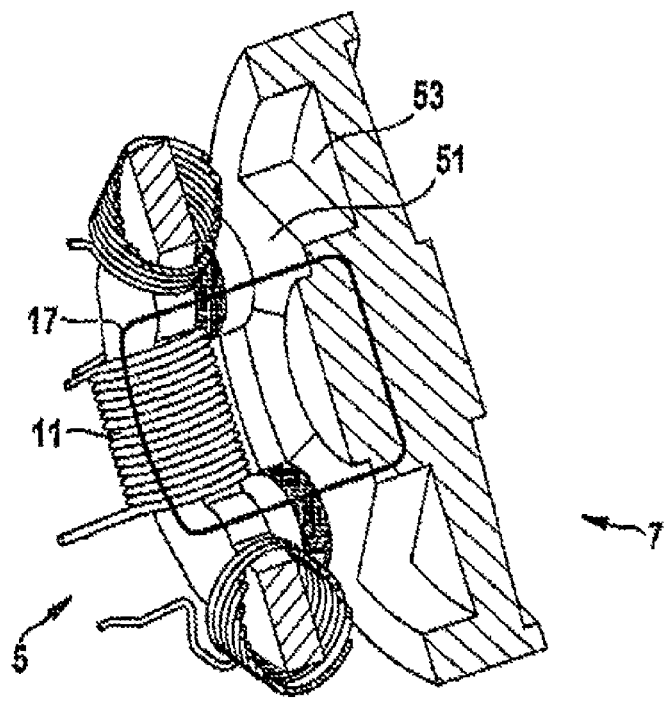

FIGS. 3A, 3B, 3C, 3D illustrate a generator 3 with an accommodating flange 47 as the rotor 7. FIGS. 3A and 3B show different perspectives of the generator 3. FIGS. 3C and 3D illustrate cross sections through the generator 3. Webs 51 and grooves 53 are arranged in the accommodating flange 47. When the magnets 13 are positioned with respect to webs 51 of the flange 47, the magnetic flux can develop both tangentially (FIG. 3C) and radially (FIG. 3D) thanks to the low reluctance. This is indicated by the magnetic lines of force 17 in FIGS. 3C and 3D.

As shown in FIG. 3B, additional grooves 55 can be arranged, for example, on that side of the flange 47 which faces the spindle 39. As a result, the fluctuation in the magnetic flux can be increased in the different positions of the rotor 7. As a result, higher voltages can be induced in the coil 11 of the stator 5. In this case, the stator can be integrated in the bearing flange 43.

FIGS. 4A, 4B, 4C illustrate possible embodiments of the stator shown in FIGS. 3A-3D. As is shown in FIG. 4A, the stator 5 can be in the form of a ring and have a plurality of magnets 13 and coils 11 connected by a yoke 23. Alternatively, for example if there is not sufficient installation space or the induced voltage is sufficient, the stator 5 can consist of a yoke section and a coil 11, as shown in FIGS. 4B and 4C. In this case, the yoke 23 can consist of solid material or of strips of sheet metal. An embodiment of the stator with only one magnet 13 is also possible. This is shown in FIG. 4C.

Figure 5A:
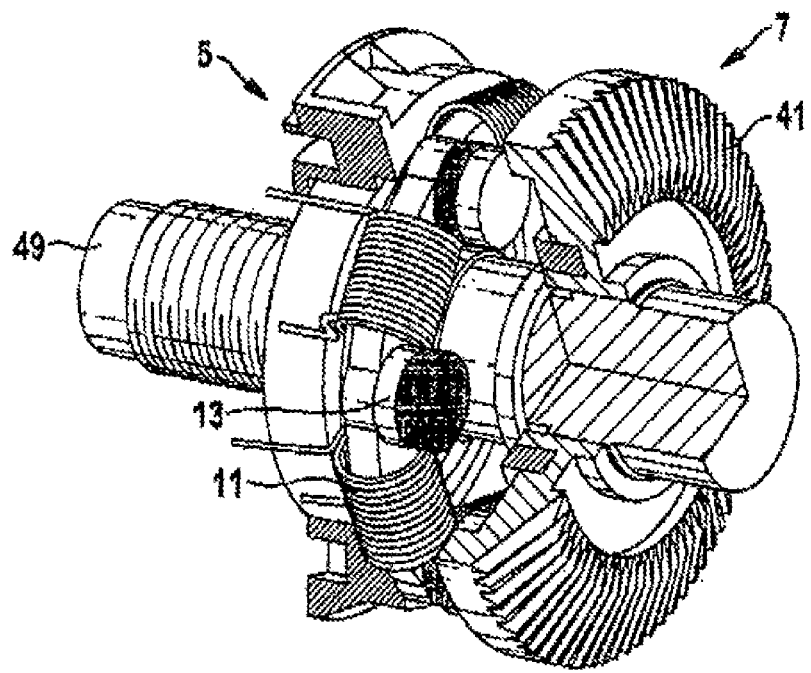
FIGS. 5A, 5B show a generator with a ring gear as rotor.
Figure 5B:
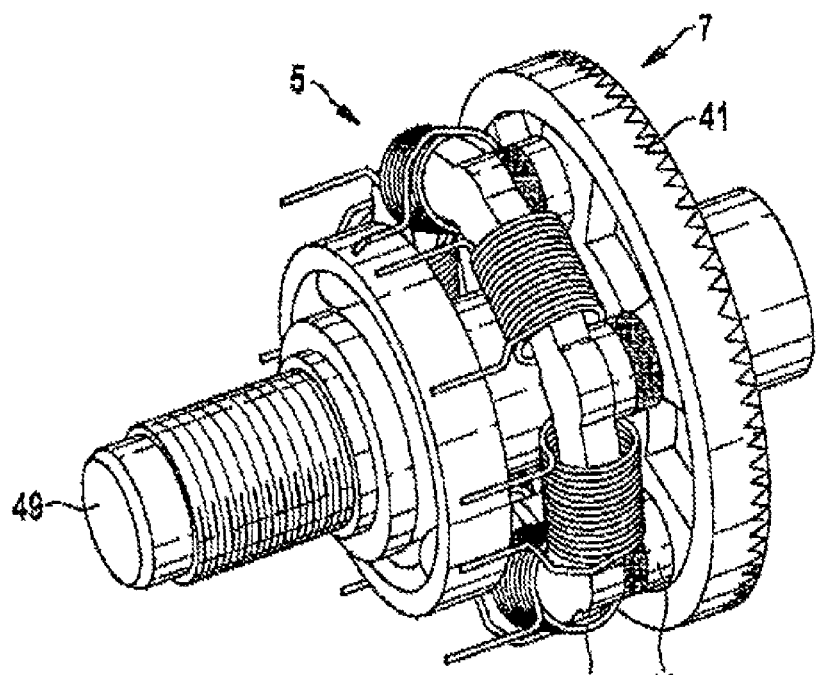

FIGS. 5A and 5B illustrate different perspectives of a generator 3 with a ring gear 41 as the rotor 7. The lower side of the ring gear can be provided with teeth in order to realize the different regions 51, 53 of the rotor 7.

Figure 6A:
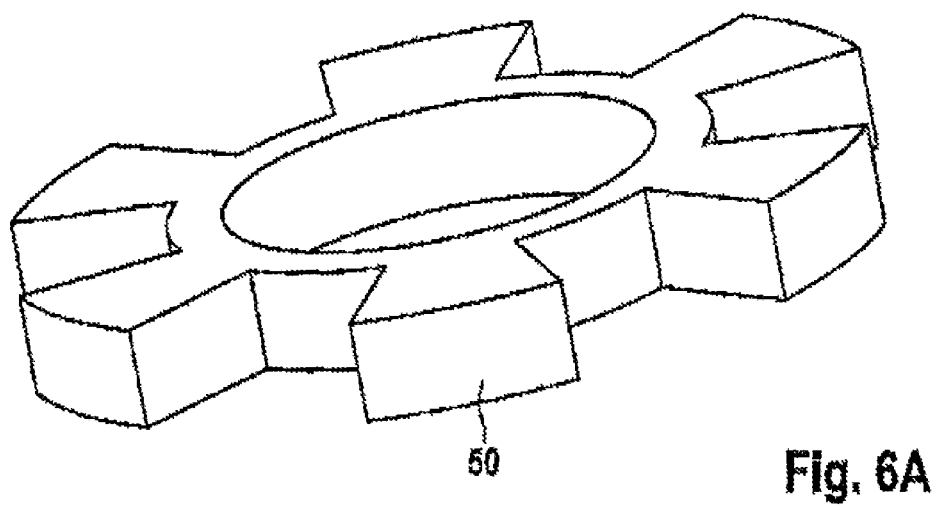
FIGS. 6A, 6B show possible configurations of the rotor.
Figure 6B:
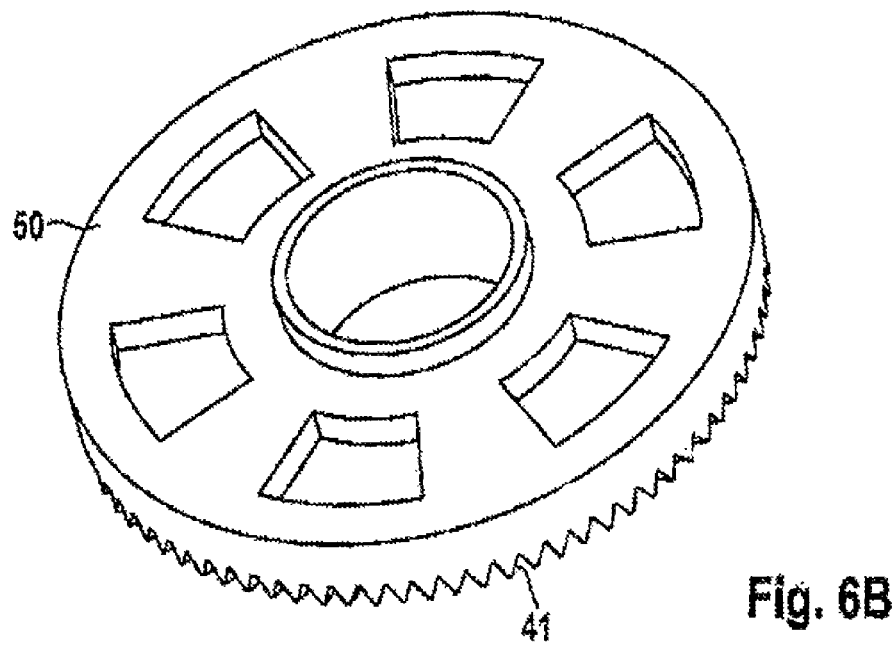

FIGS. 6A, 6B illustrate possible configurations of the rotor 7. FIG. 6A shows an intensifying yoke 50 with a high relative permeability in comparison with the materials of the rotor. The intensifying yoke 50 can reduce the reluctance. When seen individually, it can be used as the rotor 7, as shown in FIG. 6A. Alternatively, the intensifying yoke 50 can be integrated in other parts of the output drive 49 such as the ring gear 41 or the accommodating flange 47, as shown in FIG. 6B, and make the desired reluctance profile possible. In addition, it is possible to integrate the desired material properties directly in the parts of the output drive 49. For example, this can be performed by the simultaneous or successive processing of a plurality of materials during the production of the components in a sintering process.

Figure 7A:
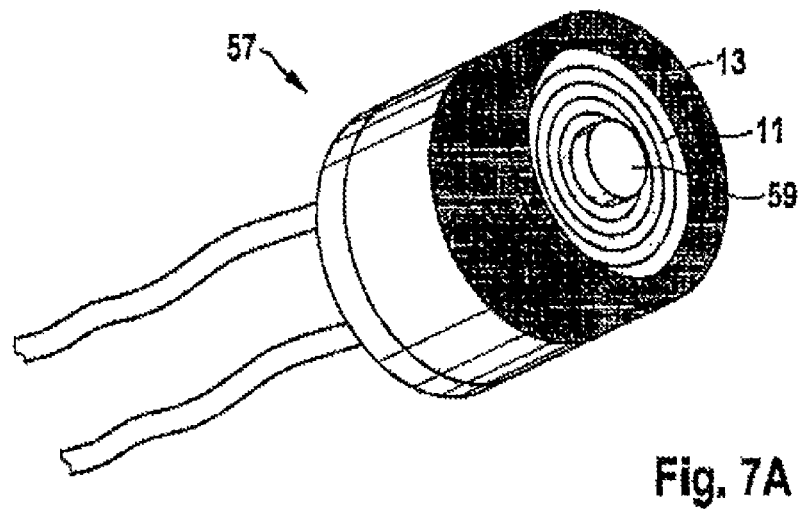
Figure 7B:
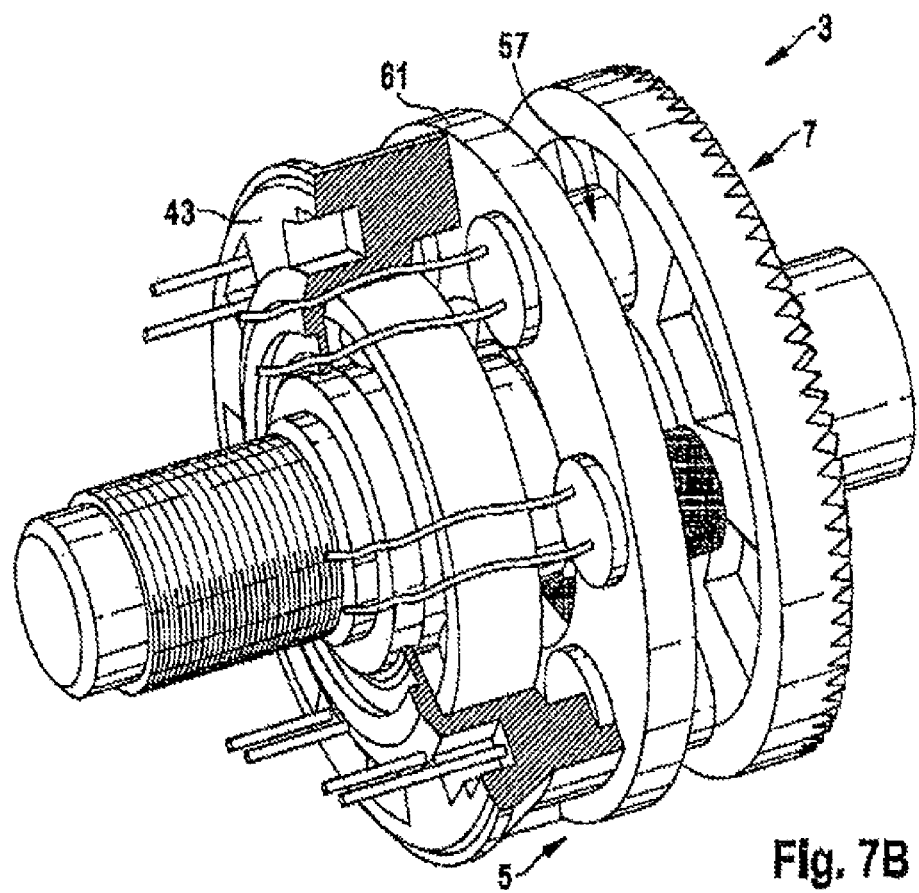

FIGS. 7A, 7B, 7C illustrate the configuration of the stator 5 with magnet coils 57. FIG. 7A shows a magnet coil 57 with a permanent magnet 13 and a coil 11 wound around the core 59. As is shown in cross section through the generator 3 in FIG. 7C, the magnet coil 57 is aligned axially and perpendicular to the ring gear 41 and the accommodating flange 47, respectively. The magnetic lines of force 17 are closed via the rotor 7 (in this case: ring gear 41) and the core 59 of the magnet coil 57.

As is shown in FIG. 7B, the magnet coils 57 can be integrated in the bearing flange 43. The magnet coils 57 can also be integrated in an additional element, such as the magnet coil former 61. The coils 11 or the magnet coils 57 can be connected in series, for example, in such a way that the output power is maximized. The number and position of the magnet coils 57 can be selected differently. For example, they can be arranged rotationally symmetrically.

FIG. 8 shows a schematic illustration of a cross section through a machine tool 1, in the form of a jigsaw. The jigsaw 1 has a lifting rod 65, which can move linearly up and down. The stator 5 is arranged around the lifting rod 65. The light source 15 illuminates a working area 45 during operation of the rotor 7. The lifting rod 65 and the saw blade 67 arranged thereon perform a linearly oscillating movement 63 (indicated by an arrow).

Figure 9A:
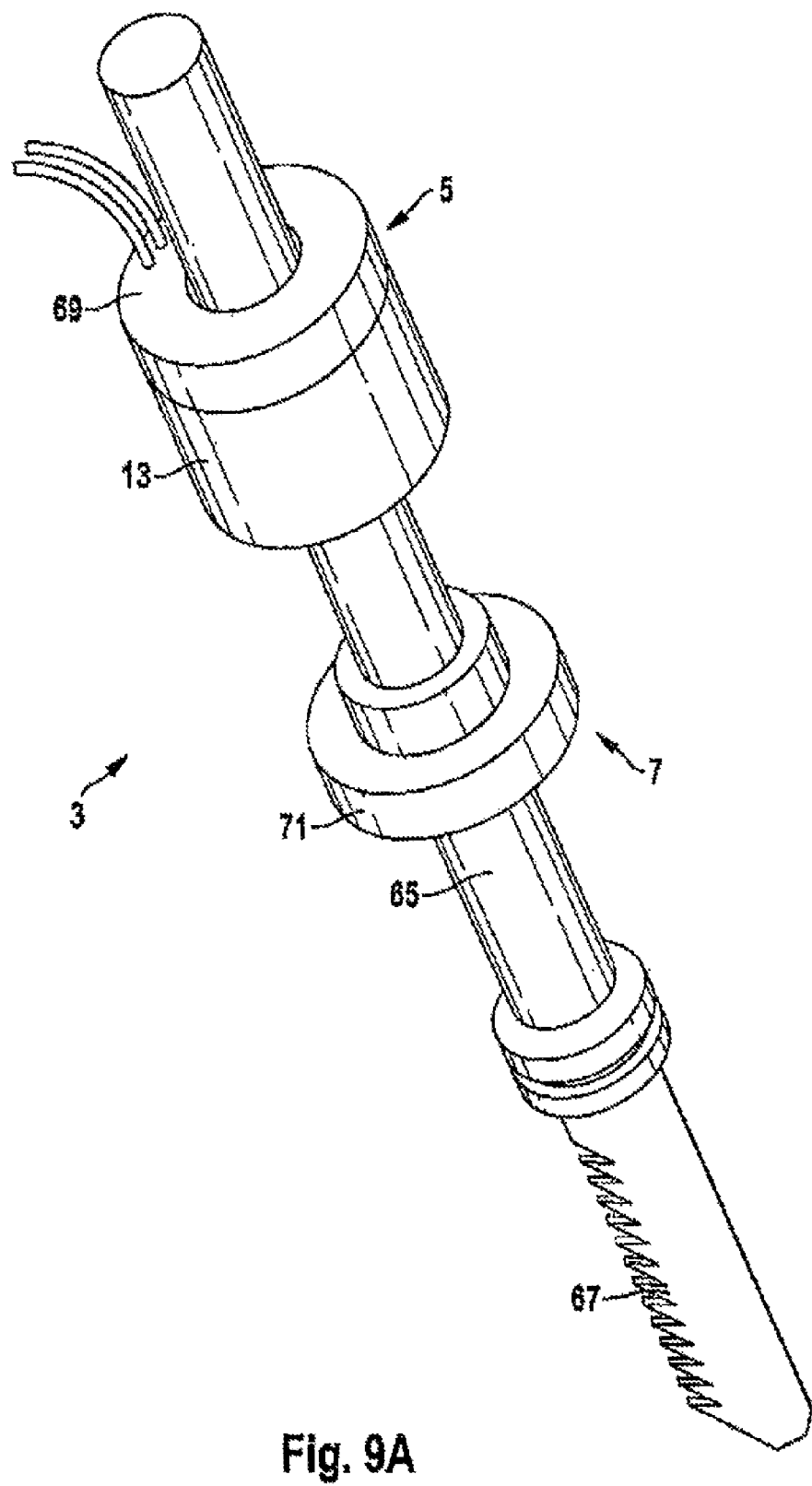
FIGS. 9A, 9B, 9C show a generator with a linearly oscillating rotor.
Figure 9B:
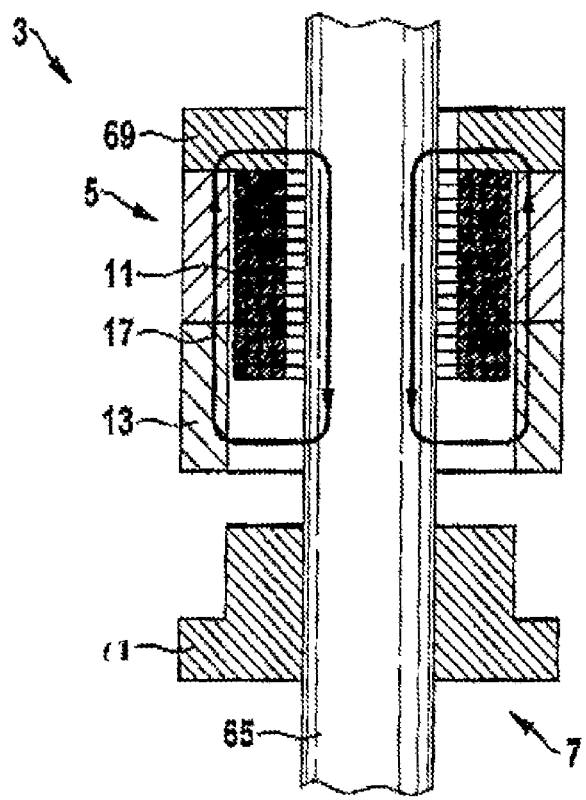
Figure 9C:
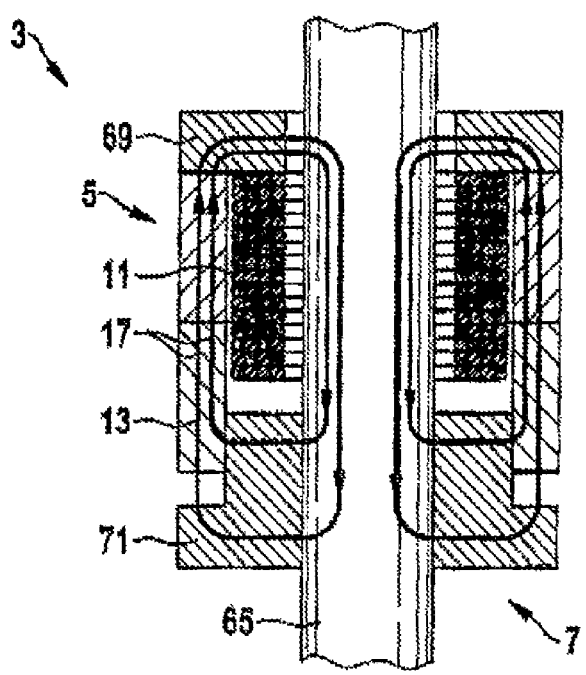

FIGS. 9A, 9B, 9C illustrate embodiments of the generator 3 with a linearly oscillating rotor 7. FIG. 9A shows a plan view of the generator 3. FIGS. 9B and 9C show the generator 3 in cross section in different positions of the rotor 7. The stator 5 with the coil 11 and the magnet 13 surrounds the lifting rod 65 in the form of a ring. In addition, a magnetic return disk 69 with a relative magnetic permeability which is preferably high is arranged on the stator. The rotor 7 consists of the lifting rod 65 and a magnetic return yoke 71, which is in the form of a disk and is moved along with the lifting rod 65. The magnetic return yoke 71 remains below the stator 5 in the exemplary embodiment shown in FIG. 9.

In FIG. 9B, the rotor 7 is located in a lower position, with the result that the magnetic return yoke 71 of the rotor 7 is so far removed from the stator 5 that the magnetic lines of force 17 (indicated by dashed lines) do not pass through the yoke 71 and are relatively weak. In FIG. 9C, the rotor 7 is in an upper position, with the result that the magnetic lines of force 17 run via the magnetic return yoke 71 of the rotor 7 and the magnetic lines of force 17 are more pronounced. In this case, the magnetic return yoke 71 can be considered to be a first region 51 of the rotor 7 with a high permeability. The remaining regions of the lifting rod 65 can be considered to be a second region 53 with a low permeability.

Figure 10A:
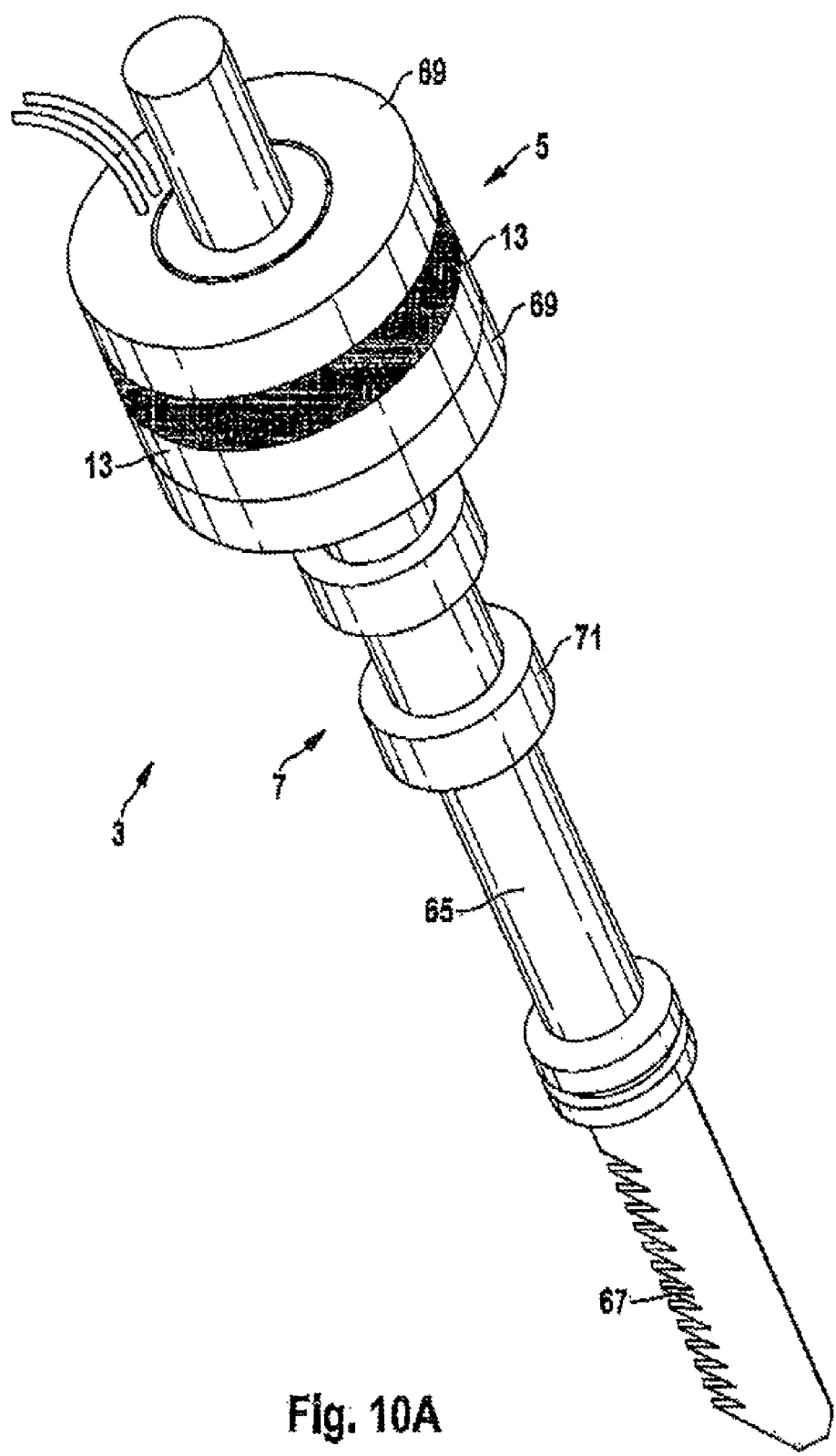
FIGS. 10A, 10B, 10C, 10D, 10E show an alternative embodiment of the generator from FIG. 9.
Figure 10B:
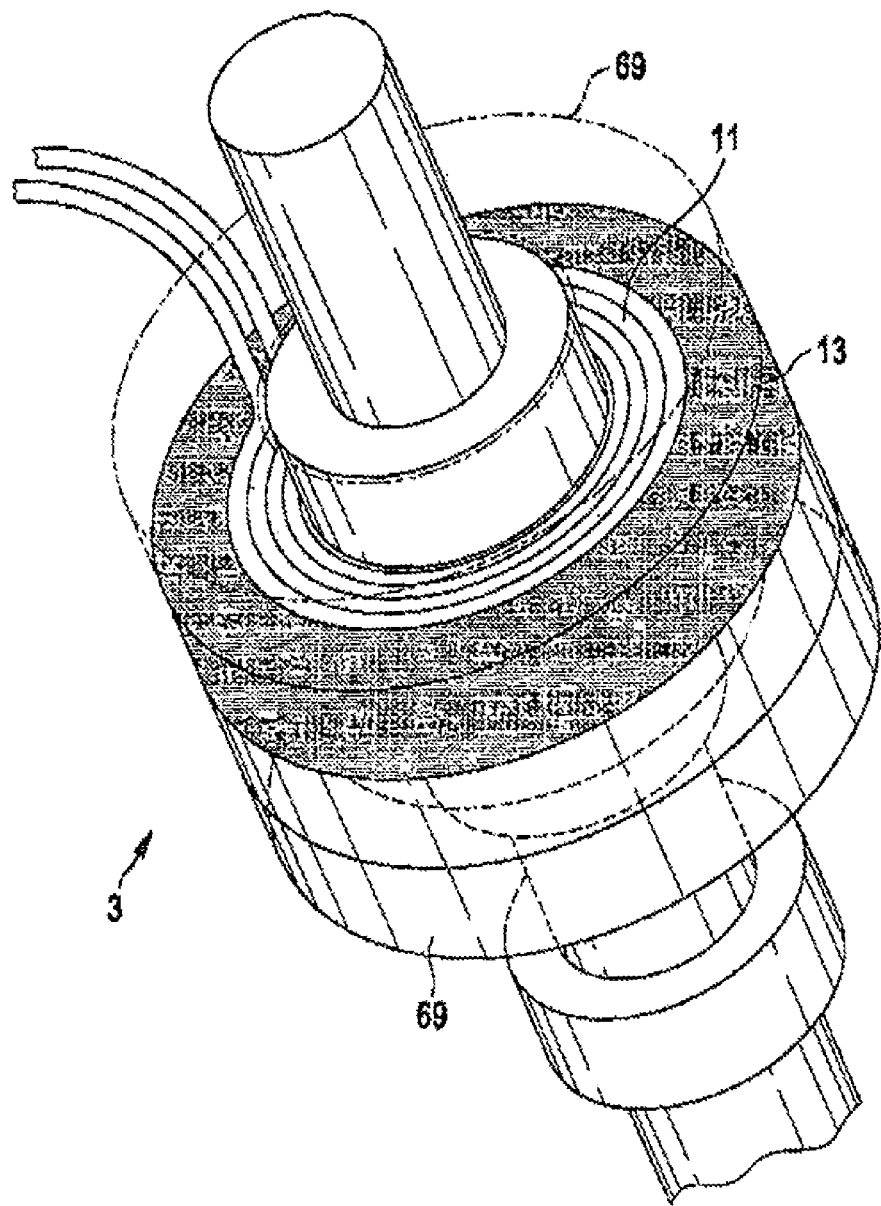
Figure 10C:
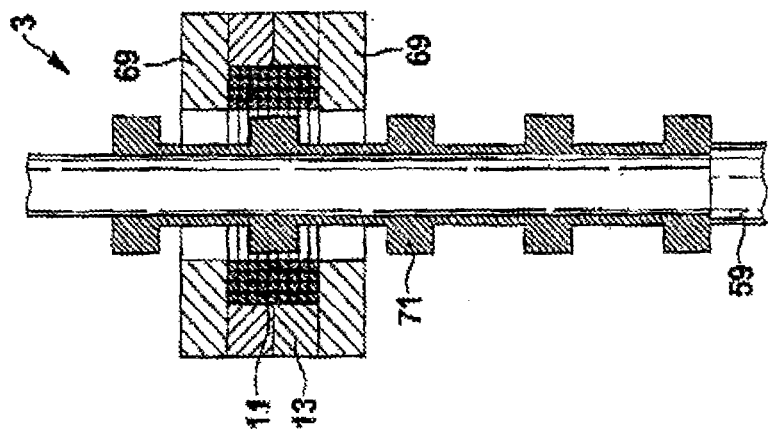
Figure 10D:
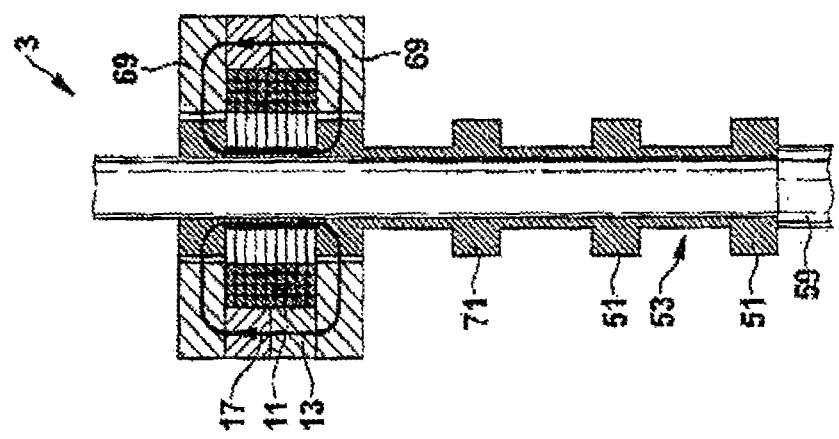
Figure 10E:
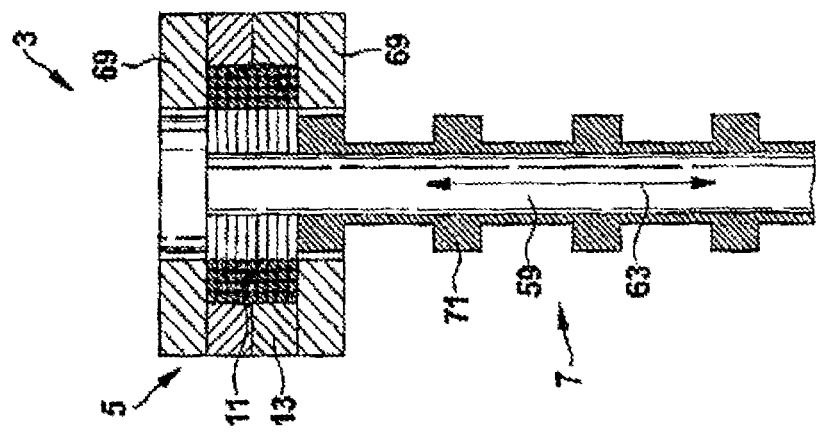

FIGS. 10A, 10B, 10C, 10D, 10E illustrate alternative embodiments of the generator 3 shown in FIGS. 9A, 9B, 9C. FIG. 10A shows a plan view of the generator 3. FIG. 10B illustrates an enlarged detail of FIG. 10A; FIGS. 10C, 10D and 10E illustrate cross sections of the generator in different movement phases of the rotor 7. The stator 5 in FIGS. 10A-10E is formed with one magnetic return disk 69 above the magnet 13 and one below the magnet. The rotor 7 with the magnetic return yoke 71 can move completely through the stator 5 in the exemplary embodiment in FIGS. 10A-10E. In comparison with the exemplary embodiment in FIG. 9, this has the advantage that a movement of the lifting rod 59 is not impaired and that higher voltages can be induced in the coil 11, as a result of a higher possible frequency of the fluctuation of the magnetic lines of force 17. As is shown in FIGS. 10A-10E, a cylindrical configuration of the components of the rotor 7 and the stator 5 can be advantageous.

By virtue of the magnetic return yoke 71, it is possible to realize the regions 51, 53 of different geometric configuration or different magnetic permeability on the rotor 7. The magnetic return yoke 71 can consist of a material with a high magnetic permeability. In addition, the magnetic return yoke 71 can be realized as part of the lifting rod 59. By virtue of the movement 63 of the alternately tapered magnetic return yoke 71, the reluctance of the magnetic circuit changes. As a result, the magnetic flux varies and a voltage is induced in the coil 11. The rotor 7 can be considered to be a "magnetic valve", which can inhibit the development paths of the magnetic flux in the manner of a bar.

By way of conclusion it should be noted that expressions such as "having" or the like are not intended to rule out the possibility of further elements or steps being provided. Furthermore, the use of "one" or "a" is not intended to rule out a greater number. In addition, features described in connection with the various embodiments can be combined with one another as desired.

What is claimed is:

1. A machine tool, comprising:
   a motor operatively coupled to and configured to move an output drive;
   a generator separate from the motor and configured to generate electrical power, said generator including:
   a stator,
   a rotor coupled to the output drive and configured to move relative to the stator with movement of the output drive,
   a coil arranged on the stator, and
   a magnet arranged on the stator,
   wherein the rotor has at least one first region and at least one second region, and
   wherein the rotor is configured such that, during movement of the rotor relative to the stator, a magnetic flux in the coil changes due to differences between the first and second regions in terms of their magnetic permeability and/or in terms of their geometric configuration, and an electrical voltage is induced.

2. The machine tool according to claim 1, wherein one of the stator and the rotor comprises a ferromagnetic material.

3. The machine tool according to claim 1, further comprising a first circuit, wherein:
the coil has a second circuit, and
the first circuit is electrically isolated from the second circuit, wherein the first circuit is connected to one of a mains supply and a battery supply and the second circuit provides electrical energy which is different from electrical energy provided by the first circuit.

4. The machine tool according to claim 1, further comprising a light source, wherein:
the light source is electrically connected to the coil such that electrical energy is supplied to the light source during movement of the rotor.

5. The machine tool according to claim 4, wherein:
the light source is electrically connected to the coil such that the light source emits a light signal during movement of the rotor, and
the light signal varies depending on a present rotation speed of the rotor.

6. The machine tool according to claim 4, wherein the light source is a laser light source.

7. The machine tool according to claim 1, further comprising an electrical energy store, wherein:
the coil is electrically connected to the electrical energy store.

8. The machine tool according to claim 1, further comprising a yoke configured to intensify the magnetic flux, wherein:
the yoke is arranged on the coil.

9. The machine tool according to claim 1, wherein the rotor is configured to perform one of a rotary movement and a linearly oscillating movement.

10. The machine tool according to claim 1, wherein the machine tool is one of an angle grinder and a saw.

11. The machine tool according to claim 1, wherein the at least one first region and the at least one second region include different geometric configurations, the at least one first region including an elevation in a direction toward the stator and the at least one second region being set back with respect to the stator in comparison to the first region wherein an air gap between the stator and the at least one second region is greater than an air gap between the stator and the at least one first region.

12. The machine tool according to claim 11, wherein the magnet is disposed adjacently to one of the at least one first region and the at least one second region during movement of the rotor relative to the stator.

13. The machine tool according to claim 12, wherein the at least one first region includes a plurality of first regions and the at least one second region includes a plurality of second regions, wherein the each of the plurality of first regions alternate with one of the plurality of second regions.

14. The machine tool according to claim 13, further comprising a light source, wherein the light source is electrically connected to the coil such that electrical energy is supplied to the light source during movement of the rotor.

15. The machine tool according to claim 14, further comprising a first circuit electrically connected to one of a mains supply and a battery supply, and the coil has a second circuit, wherein the first circuit is electrically isolated from the second circuit, the second circuit configured to provide electrical energy which is different from the electrical energy provided by the first circuit.

16. A machine tool, comprising:
a motor powered by one of a mains supply and a battery and operatively coupled to and configured to move an output drive,
a generator configured to generate electrical power separate from the power provided by one of the mains supply and a battery, said generator including a stator, a rotor coupled to the output drive and configured to move relative to the stator, a coil arranged on the stator, and a magnet arranged on the stator; and
a light source electrically connected to the coil such that electrical energy is supplied to the light source during movement of the rotor,
wherein the rotor has at least one first region and at least one second region, and
wherein the rotor is configured such that, during movement of the rotor relative to the stator, a magnetic flux in the coil changes due to differences between the first and second regions in terms of their magnetic permeability, and an electrical voltage is induced.

17. The machine tool according to claim 16, wherein:
the light source is electrically connected to the coil such that the light source emits a light signal during movement of the rotor, and
the light signal varies depending on a present rotation speed of the rotor.

18. The machine tool according to claim 16, wherein the light source is a laser light source.

19. A machine tool, comprising:
a motor driven by one of a mains supply and a battery,
a generator configured to generate electrical power separate from the power driving the motor, said generator including a stator, a rotor configured to move relative to the stator, a coil arranged on the stator, and a magnet arranged on the stator; and
a light source electrically connected to the coil such that the generated electrical power is supplied to the light source during movement of the rotor,
wherein the rotor has at least one first region and at least one second region, and
wherein the rotor is configured such that, during movement of the rotor relative to the stator, a magnetic flux in the coil changes due to differences between the first and second regions in terms of their geometric configuration, and an electrical voltage is induced in the coil which provides the power generated by the generator.

20. The machine tool according to claim 19, wherein:
the light source is electrically connected to the coil such that the light source emits a light signal during movement of the rotor, and
the light signal varies depending on a present rotation speed of the rotor.

21. The machine tool according to claim 19, wherein the light source is a laser light source.

* * * * *